United States Patent
Frumin et al.

(10) Patent No.: US 8,522,611 B2
(45) Date of Patent: Sep. 3, 2013

(54) METHOD AND APPARATUS FOR MEASURING PORE PRESSURE BEYOND THE CASING

(75) Inventors: Leonid L. Frumin, Nobosibirsk (RU); Joseph G. Barolak, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 666 days.

(21) Appl. No.: 12/707,353

(22) Filed: Feb. 17, 2010
(Under 37 CFR 1.47)

(65) Prior Publication Data
US 2011/0141847 A1    Jun. 16, 2011

Related U.S. Application Data

(60) Provisional application No. 61/153,878, filed on Feb. 19, 2009.

(51) Int. Cl.
*E21B 49/00*    (2006.01)
(52) U.S. Cl.
USPC ................. 73/152.16; 73/152.02; 367/28
(58) Field of Classification Search
USPC .......... 73/19.03, 61.47, 61.49, 64.52, 152.18, 73/152.58, 590, 152.01, 152.02, 152.05, 73/152.16; 166/250.01, 309; 175/40; 181/105; 340/853.5, 853.7; 367/28, 35, 41
See application file for complete search history.

(56) References Cited

U.S. PATENT DOCUMENTS

| | | | |
|---|---|---|---|
| 4,551,823 A * | 11/1985 | Carmichael et al. | 367/35 |
| 5,473,939 A | 12/1995 | Leder et al. | |
| 6,490,916 B1 * | 12/2002 | Goodwin et al. | 73/152.58 |
| 6,988,547 B2 | 1/2006 | Goodwin et al. | |
| 7,178,392 B2 | 2/2007 | Dhruva et al. | |
| 7,266,983 B2 | 9/2007 | Krueger et al. | |
| 2007/0038377 A1 | 2/2007 | Sayers et al. | |
| 2007/0127314 A1 | 6/2007 | Wang et al. | |
| 2007/0285274 A1 * | 12/2007 | Esmersoy | 340/853.5 |
| 2008/0033656 A1 | 2/2008 | Herwanger | |

OTHER PUBLICATIONS

O'Neil, H.T., "Theory of Focusing Radiators," Jnl of Acoustical Society of America, vol. 21, No. 5, pp. 516-526, (Sep. 1949).
Boit, M.A., "Mechanics of Deformation and Acoustic Propagation in Porous Media." Jnl of Applied Physics, vol. 33, No. 4, pp. 1482-1498, (Apr. 1962).
Mann, David M., et al., "Prediction of pore fluid pressures in sedimentary basins," Marine & Petroleum Geology, vol. 7, pp. 55-65, (Feb. 1990).
Cavitation, McGraw-Hill Encyclopedia of Science & Technology, 7th ed., vol. 3, pp. 317-210, (1992).
Law, Ben E., et al., "Abnormal Pressures in Hydrocarbon Environments," AAPG Hedberg Research Conference, Golden, Colorado, AAPG Memoir 70, pp. 1-8, (Jun. 8-10, 1994).

(Continued)

*Primary Examiner* — Isam Alsomiri
*Assistant Examiner* — Daniel L Murphy
(74) *Attorney, Agent, or Firm* — Mossman Kumar & Tyler PC

(57) ABSTRACT

Acoustic waves from a controllable downhole acoustic source in a cased borehole are focused into a region of an earth formation. A hydrophone is used to monitor acoustic signals for onset of cavitation. The estimated pressure from the source in the focus region provides an estimate of formation pore pressure.

20 Claims, 3 Drawing Sheets

(56) References Cited

OTHER PUBLICATIONS

Law, Ben E., et al.,"Abnormal Pressure in Hydrocarbon Environments," reprint with C.W. Spencer, AAPG Memoir 70, pp. 1-11 (1998).

Carcione, Jose M., et al., "Poisson's ratio at high pore pressure," Geophysical Prospecting, 50, pp. 97-106, (2002).

Chilibon, I., et al., "Ultrasound Underwater Transducer for Extracorporeal Shock Wave Lithotripsy (ESWL)," Romanian Reports in Physics, vol. 57, No. 4, pp. 979-992 (2005).

* cited by examiner

METHOD AND APPARATUS FOR MEASURING PORE PRESSURE BEYOND THE CASING

CROSS-REFERENCES TO RELATED APPLICATIONS

This application claims priority from U.S. Provisional Patent Application Ser. No. 61/153,878 filed on 19 Feb. 2009.

BACKGROUND OF THE PRESENT DISCLOSURE

1. Field of the Disclosure

The present disclosure relates generally to geological exploration in wellbores. More particularly, the present disclosure describes an apparatus, a machine-readable medium, and a method useful for obtaining improved measurements of formation pore pressure downhole.

2. Description of the Related Art

To obtain hydrocarbons such as oil and gas, boreholes are drilled by rotating a drill bit attached at a drill string end. During drilling operations, an important aspect of drilling operations is to measure the formation pore pressure. Numerous methods exist for measurement of formation pressure. For example, U.S. Pat. No. 7,266,983 to Krueger et al., having the same assignee as the present disclosure, teaches a Measurement While Drilling (MWD) method of determining a formation pressure during drawdown of a formation comprising sampling fluid from a formation using a downhole tool. A fluid sample pressure is determined at two different times during the drawdown. The fluid sample pressures are analyzed using a higher-order pressure derivative with respect to time technique to determine the formation pressure during the drawdown. Another method of determining a formation pressure during drawdown of a formation comprises sampling fluid from a formation using a downhole tool. A fluid sample pressure is determined at two different times during the drawdown. The fluid sample pressures are analyzed using at least two analysis techniques to each determine an estimate of the formation pressure during the drawdown. The measurement of formation pore-pressure is important in the implementation of a completion scheme for a production borehole and further development of a reservoir. Wireline methods also exist for estimation of formation pore pressure. See, for example, U.S. Pat. No. 5,473,939 to Leder et al.

Once a borehole has been cased, measurement of formation pore pressure from downhole measurements becomes more complicated. In prior art methods, it is necessary to perforate the casing to make such measurements or, in the case of producing wells, disconnect the production tubing to carry out the pressure tests. Additional testing of formation pressure in a cased hole is necessary in at least three situations. The first situation is to measure the formation pore pressure in a producing reservoir. This may be needed, for example, to alter injection operations in a secondary recovery operation. The method of the present disclosure enables the pore pressure measurement to be done without having to shut down production to conduct time-consuming draw-down or pressure buildup tests. A second situation arises when measuring pore pressure in a cased hole is to select additional intervals for conducting perforation operations to develop previously bypassed oil and gas. A third reason for measuring formation pore pressure is to serve as a check on completion operations: there are instances in which perforations may be partially blocked, and a measurement of formation pore pressure may identify when this has occurred.

The present disclosure is directed towards an apparatus and method for measuring formation pore pressure through casing without lengthy draw-down or pressure buildup tests.

SUMMARY OF THE DISCLOSURE

One embodiment of the disclosure is a method of estimating a formation pore pressure of an earth formation. The method includes: using an acoustic source inside a borehole for producing an acoustic wave in the formation; using a sensor for producing a signal indicative of a cavitation in the earth formation resulting from the produced acoustic wave; and using a processor for estimating the formation pore pressure from the produced signal.

Another embodiment of the disclosure is an apparatus configured to estimate a formation pore pressure of an earth formation. The apparatus includes: an acoustic source configured to produce an acoustic wave in an earth formation from inside a borehole; a sensor configured to produce a signal of a cavitation in the earth formation resulting from the produced acoustic wave; and a processor configured to estimate the formation pore pressure from the produced signal.

Another embodiment of the disclosure is a computer-readable medium product having stored thereon instructions that, when read by at least one processor, enable the at least one processor to perform a method, the method comprising: estimating a formation pore pressure of an earth formation using: a signal responsive to a cavitation in the earth formation resulting from use of a focused acoustic source inside a borehole, and a power of the acoustic source.

BRIEF DESCRIPTION OF THE DRAWINGS

The present disclosure is best understood with reference to the accompanying figures wherein like numerals refer to like elements and wherein.

DETAILED DESCRIPTION OF THE DISCLOSURE

Figure 1:
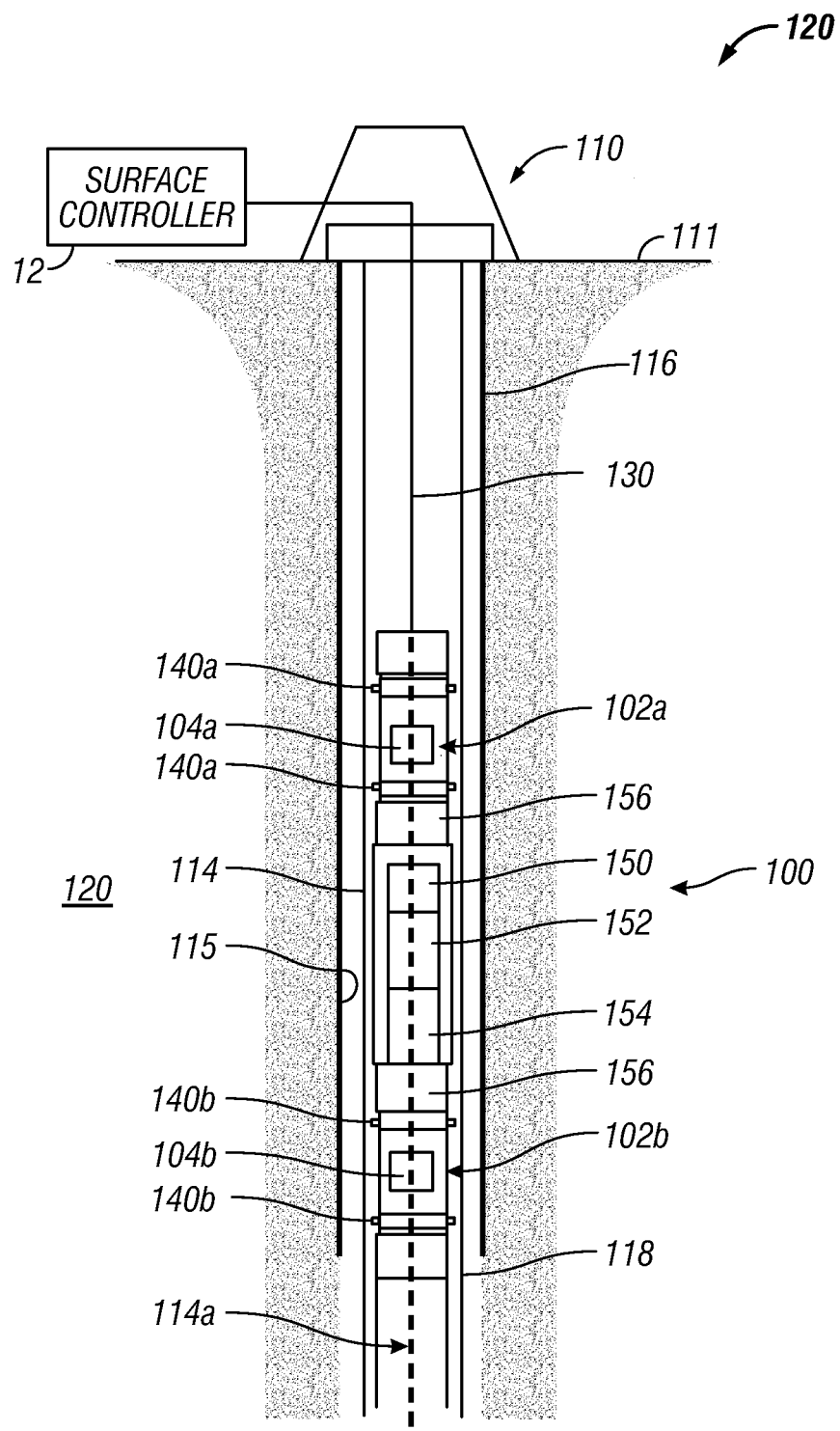
FIG. 1 shows an exemplary apparatus suitable for performing the method according to one embodiment of the present disclosure conveyed within a wellbore having a casing.

FIG. 1 shows an exemplary apparatus suitable for performing one embodiment of the method according to one embodiment of the present disclosure conveyed within a wellbore 114 having a casing 116. FIG. 1 shows a rig 110 on a surface 111 and positioned over a subterranean earth formation of interest 120. The rig 110 may be a part of a land well production/construction facility or an offshore well production/construction facility. A wellbore 114 formed below the rig 110 may include a cased portion 116 and/or an open hole portion 118. In certain instances (e.g., during drilling, completion, work-over, and the like), a logging operation may be conducted to collect information relating to the earth formation 120 and/or the wellbore 114. Typically, a tool system 100 may be conveyed downhole via an umbilical 130 to measure one or more parameters of interest relating to the earth formation 120, such as resistivity. The term "umbilical" as used hereinafter includes a cable, a wireline, slickline, drill pipe, coiled tubing, or other devices suitable for conveying the tool system 100 into the wellbore 114. The tool system 100 may include one or more modules 102a, 102b each of which has a tool or a plurality of tools 104a, 104b adapted to perform one or more downhole tasks. The term "module" includes a device such as a sonde or sub that is suited to enclose or otherwise support a device that is to be deployed into the wellbore 114. While two proximally positioned modules 102a, 102b and two associated tools 104a, 104b are shown, it should be understood that any finite number may be used.

The tool 104a may be a formation evaluation (FE) tool adapted to measure one or more parameters of interest relating to the earth formation 120 and/or the wellbore 114. The term formation evaluation (FE) tool encompasses measurement devices, sensors, and other like devices that, actively or passively, collect data about the various characteristics of the earth formation 120, including but not limited to directional sensors for providing information about the tool system 100 orientation or direction of movement and formation testing sensors for providing information about the characteristics of the reservoir fluid or for evaluating the reservoir conditions. The formation evaluation (FE) sensors may include resistivity sensors for determining the earth formation 120 resistivity or dielectric constant of the earth formation or the presence or absence of hydrocarbons; acoustic sensors for determining the acoustic porosity of the earth formation and the bed boundary in the earth formation 120; nuclear sensors for determining density of the earth formation 120, nuclear porosity and/or certain rock characteristics; or nuclear magnetic resonance (NMR) sensors for determining the porosity and/or other petrophysical characteristics of the earth formation 120. The direction and position sensors may include a combination of one or more accelerometers, gyroscopes, or magnetometers. The accelerometers preferably may provide measurements along three axes, in particular along three substantially mutually perpendicular axes. The formation testing sensors may collect earth formation fluid samples and determine the properties of the fluid, which may include physical or chemical properties. Pressure measurements may provide information about certain characteristics of the reservoir.

The tool system 100 may include telemetry equipment 150, a local or downhole processor or controller 152, and a downhole power supply 154. The telemetry equipment 150 may provide two-way communication for exchanging data signals between a surface controller or processor 112 and the tool system as well as for transmitting control signals from the surface controller 112 to the tool system 100.

A first module 102a may include a first tool 104a configured to measure a first parameter of interest and a second module 102b may include a second tool 104b that is configured to measure a second parameter of interest. In order to execute their assigned tasks, the first tool and the second tool may be in different positions. The positions may be with reference to an object such as the wellbore 114, a wellbore wall 115, or other proximally positioned tooling. The term "position" may be understood to encompass a radial position, an inclination, and/or an azimuthal orientation. In the illustration of FIG. 1, the longitudinal axis 114a of the wellbore 114 ("the wellbore axis") is used as a reference axis to describe the relative radial positioning of the tools 104a, 104b. Other objects or points may also be used as a reference frame against which movement or position may be described. Moreover, the tasks of the tools may change during a wellbore-related operation. Generally speaking, the tool may be adapted to execute a selected task based on one or more selected factors. These factors may include, but may not be limited to, depth, time, changes in earth formation characteristics, and/or the changes in tasks of other tools.

In an exemplary embodiment, the modules 102a and 102b may each be provided with positioning devices 140a, 140b, respectively, which are configured to maintain the respective modules 102a, 102b at selected radial positions relative to a reference position (e.g., the wellbore axis 114a). The positioning devices 140a, 140b may also adjust the radial positions of the respective modules 102a, 102b upon receiving one or more surface command signals or automatically in a closed-loop type manner. These selected radial positions may be maintained or adjusted independently of the radial position (s) of an adjacent downhole device (e.g., measurement tools, sonde, module, sub, or other like equipment). An articulated member, such a flexible joint 156 that couples the respective modules 102a, 102b to the tool system may provide a degree of bending or pivoting to accommodate the radial positioning differences between adjacent modules or other equipment (for example, a processor sonde). One or more of the positioning devices 140a, 140b may have fixed positioning members (not shown).

Figure 2:
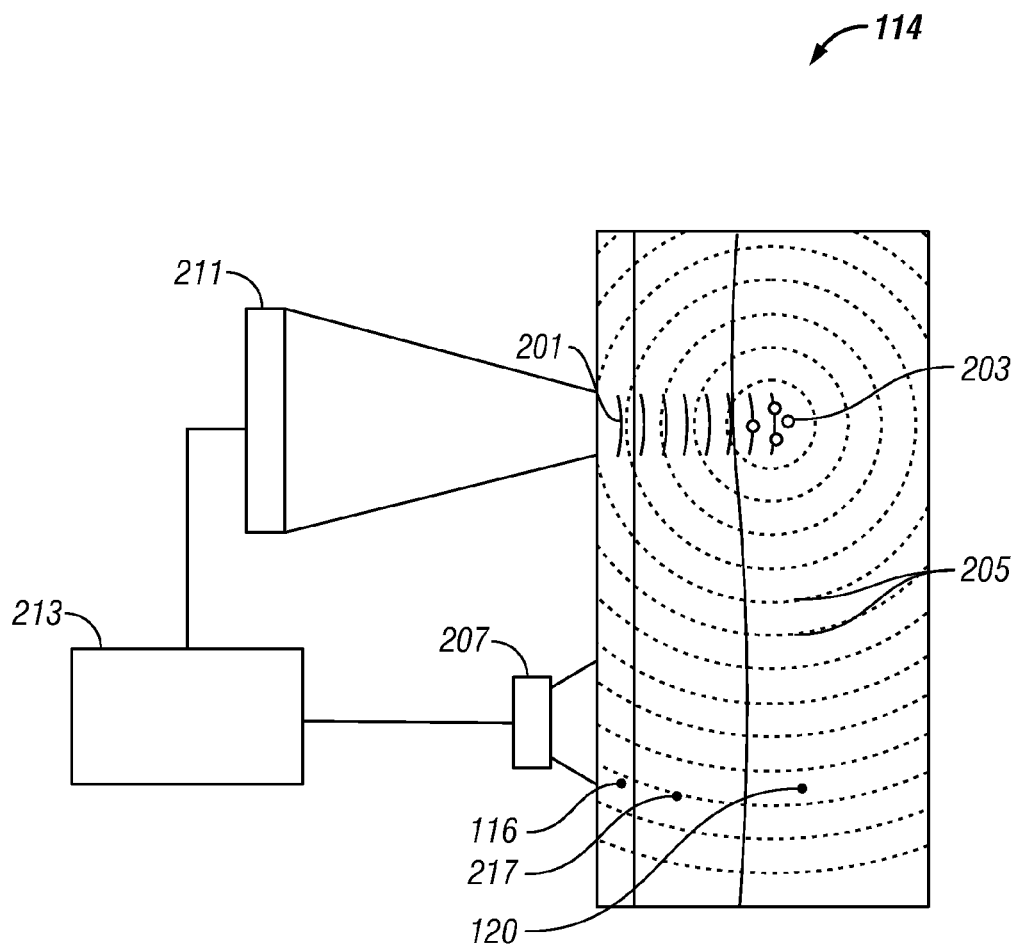
FIG. 2 schematically illustrates an apparatus conveyed downhole to make measurements of formation pore pressure according to one embodiment of the present disclosure.

FIG. 2 is a schematic illustration of the apparatus according to one embodiment of the present disclosure. A monochromatic ultrasonic source 211 within the wellbore 114 may be used to generate an acoustic wave 201 in the casing 116 which passes through the cement 217 into the earth formation 120. The ultrasonic source 211 includes a focusing arrangement (not shown) so that the generated acoustic signal is focused onto a small portion of the earth formation.

An ultrasound source suitable for the present disclosure has been used in medical applications. It comprises a piezoceramic sandwich-transducer which initiates sound waves into water. For the present disclosure, sound waves are generated into the borehole fluid. The source is provided with a metallic horn that concentrates and amplifies the ultrasound energy. See Chilibon et al., (2005).

An alternate embodiment of the disclosure uses a concave quartz crystal. The pressure variations along the axis of symmetry of such a concave crystal in a fluid are discussed in O'Neil (1949). The conclusions reached by O'Neil include the following:

(1) The pressure amplitude at the center of curvature is $\rho c u_o k h$, where $\rho$ is the fluid density, c is the compressional velocity in the fluid, $u_o$ is the displacement at the surface of the concave crystal, k is the way-number and h is the distance from the center of the crystal to the observation point. Hence to obtain a strong focusing effect, the distance h should be large compared with the wave-length; and (2) The point of greatest pressure is on the source side of the center of curvature and approaches the center of curvature with increasing kh; the greatest pressure is not much larger than the pressure at the center of curvature, except when kh is small. The disclosures of Chilibon and O'Neil may serve as guidelines for the design of a transducer for the present disclosure. Alternatively, a phased array of transducers in contact with the borehole wall could be used to focus acoustic waves to a specific location. An advantage of having contact transducers is that the reflection from the inside of the casing is eliminated, thus reducing power requirements.

The focused acoustic waves generate cavitation bubbles 203 in the earth formation. The term "cavitation" in this document is used to be given its dictionary definition:

the process of cavitating: as a: the formation of partial vacuums in a liquid by a swiftly moving solid body (as a propeller) or by high-intensity sound waves.

The cavitation bubbles produce broadband acoustic noise 205 that may be detected by a hydrophone 207 in the borehole. A processor/controller 213 processes the signal received by the hydrophone and processes the data to provide an estimate of the formation pore pressure. The same or different processor/controller may be used to control the acoustic source 211.

In an exemplary embodiment, the source is configured to focus the acoustic wave to a size of 3 mm×3 mm. This is the area where cavitation may be expected to occur. Cavitation will occur when the sonic pressure $P_U$ of the ultrasonic wave equals the static pressure. For an assumed depth of 500 m, this requires a pressure of 10 MPa. The required power density for the acoustic wave is given by $$I = \frac{P_U^2}{2\rho c}, \quad (1)$$

where $\rho \approx 10^3$ kg/m$^3$, c=1.5 km/s. This gives an intensity of 3.3 kW/cm$^2$.

The area of the region of focus is 3 mm×3 mm 0.1 cm$^2$. This gives a power requirement in the region of focus of 330 W.

In the process of focusing, the ultrasound propagates through layers of metal and cement of the casing string. Intensity losses due to sound reflection at the interfaces, Raleigh scattering, and attenuation of sound occur. The highest energy losses (up to 40%) may occur due to reflection at the interface between cement and metal. Assuming that average losses constitute 50% of sonic intensity, the focusing system must have total power of about ~700 W. Let us assume the emitting focusing system has the area of 100 cm$^2$. Such an area inside the casing is realizable. In order for total power to reach 660 W, intensity of the emitter must be about ~7 W/cm$^2$. This is 30% less than threshold intensity for piezoelectric emitters (~10 W/cm$^2$). If radiation efficiency of the emitter is ~70%, maximal power consumption during a pulse for such a tool will not exceed 1 KW, which is quite acceptable for downhole measurements in a pulsed mode.

In practice, the controller 213 adjusts the power output of the acoustic source 211. For a simple material model taking into account real acoustic properties of the emitting system, metal and cement of the casing 116, and the rock formation 120 around the wellbore 114, one can compute, in the chosen frequency domain, the attenuation coefficients, reflection coefficients, and propagation coefficients for the ultrasonic wave propagating through the casing 116, cement 117 and the formation 120. As a result of these computations, the amplitude of sonic pressure $P_u$ is found in the focus of the ultrasonic wave, which has propagated through the casing into the formation around the wellbore. The process is repeated at different power levels of the acoustic source 211 until cavitation is detected. The amplitude of the sonic pressure can then be used to calculate the formation pore pressure. To reduce losses, the ultrasonic wavelength should be selected to be greater than the typical size of heterogeneities in cementing. Estimates show that, in this case, the ultrasound frequency may not exceed 5 MHz.

Figure 3:
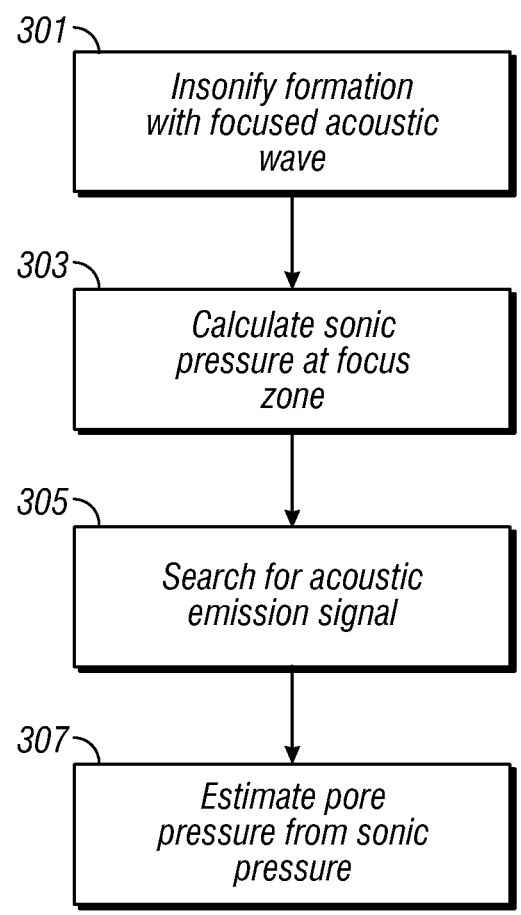
FIG. 3 is a flow chart showing some of the steps of the method according to one embodiment of the present disclosure.

FIG. 3 is a schematic flow chart of the method according to one embodiment of the present disclosure. The formation is insonified with a focused acoustic wave 301. In this, a powerful monochromatic ultrasonic source, controlled by the control module, changes the intensity of ultrasonic radiation. By means of a focusing ultrasonic system, the emitted ultrasound propagates through the casing wall 116 and is focused in the formation 120 around the wellbore 114. The sonic pressure in the focus zone is calculated 303. This may involve using a simple material model taking into account real acoustic properties of the emitting system, metal and cement of the casing 116, and the rock formation 120 around the wellbore 114, and computing the attenuation coefficients, reflection coefficients, and propagation coefficients for the ultrasonic wave propagating through the casing string materials. As a result of these computations, the amplitude of sonic pressure $P_U$ is found in the focus zone of the ultrasonic wave, which has propagated through the casing into the formation around the wellbore 114. At the same instant when the ultrasonic radiation starts, the search for the acoustic emission signal in a wide frequency range is initiated 305.

When noticeable wideband noise emerges, one may conclude that cavitation process has begun in the pore fluid due to ultrasonic radiation. The threshold intensity I at which cavitation begins is thus determined. Threshold pore pressure PS in the pore fluid corresponding to the beginning of cavitation is found 307 from threshold intensity IS according to the relation $P_s = \sqrt{2\rho cI}$ where $\rho$ and c are the density and the velocity of sound in pore fluid respectively. It is assumed that one can neglect pressure of saturated gas bubbles in pore fluid and surface tension of these bubbles, as these two values are small compared to static pressure, starting from the depth of ~100 m. For this reason, the measured pore pressure is basically identical to local hydrostatic pressure in pore fluid, $P_0 = P_S$.

With the ability to focus acoustic energy onto an area as small as 3 mm×3 mm, it is feasible to identify differences in pore pressure between layers of a laminated reservoir. Typically, the pore-pressure would be higher in porous sand intervals than in shale layers. The method of the present disclosure makes it possible to identify these pressure differences and implement completion operations based on this structure. In contrast, flow tests would measure reservoir properties over larger intervals and thus may miss high pressure sand intervals that could cause damage to a sand control screen.

As noted above, determination of formation pore pressure through casing has other applications. The first application is in a producing reservoir where it is desired to measure the formation pore pressure. This may be needed, for example, to alter injection operations in a secondary recovery operation. The method of the present disclosure enables the pore pressure measurement to be done without having to shut down production to conduct time-consuming draw-down or pressure buildup tests. A second application for measuring pore pressure in a cased hole is to select additional intervals for conducting perforation operations to develop previously bypassed oil and gas. A third application for measuring formation pore pressure is to serve as a check on completion operations: there are instances in which perforations may be partially blocked, and a measurement of formation pore pressure can identify when partial blockage has occurred.

The disclosure above was specific to making measurements in a cased borehole. This is not to be construed as a limitation and the method may be implemented in an open hole. With the tool being disposed on a wireline, it is possible to get a log of the formation pore pressure. This is in contrast to prior art methods for pore pressure measurements wherein pressure estimates are made using a probe that samples the formation and makes pressure measurements at discrete intervals.

The processing of the measurements made in wireline applications may be done by the surface processor 112, by a downhole processor, or at a remote location. The data acquisition may be controlled at least in part by the downhole electronics. Implicit in the control and processing of the data is the use of a computer program on a suitable machine readable-medium that enables the processors to perform the control and processing. The machine-readable medium may include ROMs, EPROMs, EEPROMs, flash memories and optical disks. The term processor is intended to include devices such as a field programmable gate array (FPGA).

What is claimed is:

1. A method of estimating a formation pore pressure of an earth formation, the method comprising:
   using an acoustic source inside a borehole for producing an acoustic wave in the formation;
   using a sensor for producing a signal indicative of a cavitation in the earth formation resulting from the produced acoustic wave; and
   using a processor for estimating the formation pore pressure from the produced signal.

2. The method of claim 1 wherein producing the acoustic wave further comprises producing a focused acoustic wave.

3. The method of claim 2 wherein producing the focused acoustic wave further comprises using a device selected from: (i) a curved transducer, and (ii) a plane transducer in conjunction with a focusing device.

4. The method of claim 1 wherein estimating the formation pore pressure further comprises extrapolating a power of the acoustic source into the earth formation.

5. The method of claim 1 wherein estimating the formation pore pressure further comprises applying a correction for attenuation, reflection and propagation effects.

6. The method of claim 1 further comprising using the estimated formation pore pressure for at least one of: (i) controlling a secondary recovery operation, (ii) selecting a zone in the casing for perforation, (iii) indicating of completion, and (iv) identifying sand and shale laminations.

7. The method of claim 1 further comprising conveying the acoustic source into the borehole on an umbilical.

8. The method of claim 1 further comprising using, as the sensor, a hydrophone.

9. The method of claim 1 further comprising using the acoustic source in a cased borehole.

10. An apparatus configured to estimate a formation pore pressure of an earth formation, the apparatus comprising:
    an acoustic source configured to produce an acoustic wave in the earth formation from inside a borehole;
    a sensor configured to produce a signal of a cavitation in the earth formation resulting from the produced acoustic wave; and
    a processor configured to estimate the formation pore pressure from the produced signal.

11. The apparatus of claim 10 wherein the acoustic source is further configured to produce a focused acoustic wave.

12. The apparatus of claim 11 further comprising a device configured to produce the focused acoustic wave, the device being selected from: (i) a curved transducer, and (ii) a plane transducer in conjunction with a focusing device.

13. The apparatus of claim 10 wherein the processor is configured to estimate the formation pore pressure by extrapolating a power of the acoustic source into the earth formation.

14. The apparatus of claim 10 wherein the processor is configured to estimate the formation pore pressure by applying a correction for attenuation, reflection and propagation effects.

15. The apparatus of claim 10 wherein the processor is configured to use the estimated pore pressure for at least one of: (i) controlling a secondary recovery operation, (ii) selecting a zone in the casing for perforation, (iii) indicating a quality of completion, and (v) identifying sand and shale laminations.

16. The apparatus of claim 10 further comprising an umbilical configured to convey the acoustic source into the borehole.

17. The apparatus of claim 10 wherein the sensor further comprises a hydrophone.

18. The apparatus of claim 10 wherein the borehole further comprises a cased borehole.

19. A computer-readable medium product having stored thereon instructions that when read by at least one processor enable the at least one processor to perform a method, the method comprising:
    estimating a formation pore pressure of an earth formation using a signal responsive to a cavitation in the earth formation resulting from use of a focused acoustic source inside a borehole, and a power of the acoustic source.

20. The computer-readable medium of claim 19 further comprising at least one of: (i) a ROM, (ii) an EPROM, (iii) an EEPROM, (iv) a flash memory, and (v) an optical disk.

* * * * *